United States Patent
Dahl et al.

(10) Patent No.: US 11,873,750 B2
(45) Date of Patent: Jan. 16, 2024

(54) METHOD FOR PRECONDITIONING AT LEAST A PART OF AN ENGINE SYSTEM OF A VEHICLE

(71) Applicant: VOLVO TRUCK CORPORATION, Gothenburg (SE)

(72) Inventors: Johan Dahl, Gothenburg (SE); Martin Wilhelmsson, Gothenburg (SE); Oscar Stjernberg, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/935,671

(22) Filed: Sep. 27, 2022

(65) Prior Publication Data
US 2023/0108972 A1 Apr. 6, 2023

(30) Foreign Application Priority Data
Oct. 4, 2021 (EP) .................................... 21200766

(51) Int. Cl.
*F01N 3/20* (2006.01)
*H01M 10/615* (2014.01)
(Continued)

(52) U.S. Cl.
CPC ....... *F01N 3/2013* (2013.01); *B01D 53/9418* (2013.01); *B01D 53/9495* (2013.01);
(Continued)

(58) Field of Classification Search
CPC .......... B01D 2255/911; B01D 53/9418; B01D 53/9495; F01N 2240/16; F01N 2590/08;
(Continued)

(56) References Cited

U.S. PATENT DOCUMENTS 8,423,221 B2 * 4/2013 Watanabe ............... F01N 11/00
701/22
10,590,819 B2 * 3/2020 Crawford .............. F01N 3/2013
(Continued)

FOREIGN PATENT DOCUMENTS

DE    102015015794 A1    8/2016
DE    102016216492 A1    3/2018
(Continued)

OTHER PUBLICATIONS

Extended European Search Report in corresponding European Application No. 21200766.0 dated Mar. 25, 2022 (7 pages).
Extended European Search Report in related European Application No. 21200772.8 dated Mar. 28, 2022 (6 pages).
U.S. Non Final Office Action dated Jan. 26, 2023 in related U.S. Appl. No. 17/935,685, 20 pages.

*Primary Examiner* — Jesse S Bogue
(74) *Attorney, Agent, or Firm* — Venable LLP; Jeffri A. Kaminski (57) ABSTRACT

A method for preconditioning at least a part of an engine system of a vehicle. The engine system includes an engine and an exhaust aftertreatment system, EATS. The method providing predicted vehicle operational information comprising a vehicle operational initialization time and predicted engine operation, determining whether or not cold-start emissions of the predicted engine operation achieves a threshold criterium, in response to achieving the threshold criterium, preconditioning at least a part of the engine system such that at least said part of the engine system is preconditioned at a time of the vehicle operational initialization time.

12 Claims, 5 Drawing Sheets

(51) Int. Cl.
    *H01M 10/625*     (2014.01)
    *H01M 10/63*     (2014.01)
    *H01M 10/657*     (2014.01)
    *F02M 26/35*     (2016.01)
    *B01D 53/94*     (2006.01)
    *H01M 8/04007*     (2016.01)

(52) U.S. Cl.
    CPC ........... *F01N 3/2066* (2013.01); *F02M 26/35* (2016.02); *H01M 8/04037* (2013.01); *H01M 10/615* (2015.04); *H01M 10/625* (2015.04); *H01M 10/63* (2015.04); *H01M 10/657* (2015.04); *B01D 2255/911* (2013.01); *F01N 2610/02* (2013.01); *F01N 2610/1406* (2013.01); *H01M 2220/20* (2013.01); *H01M 2250/20* (2013.01)

(58) Field of Classification Search
    CPC ............. F01N 2590/11; F01N 2610/02; F01N 2610/1406; F01N 2900/0602; F01N 2900/10; F01N 2900/12; F01N 3/02; F01N 3/2013; F01N 3/2066; F01N 3/208; F01N 9/007; F02M 26/35; F02N 19/02; H01M 10/615; H01M 10/625; H01M 10/63; H01M 10/657; H01M 2220/20; H01M 2250/20; H01M 8/04037
See application file for complete search history.

(56) References Cited

U.S. PATENT DOCUMENTS

| | | | |
|---|---|---|---|
| 10,598,109 B2 * | 3/2020 | Mehta | F01N 3/2013 |
| 11,506,136 B1 | 11/2022 | Harris et al. | |
| 11,519,313 B1 * | 12/2022 | Martz | F01N 3/22 |
| 2012/0247084 A1 * | 10/2012 | Atluri | F01N 9/00 |
| | | | 60/274 |
| 2018/0291827 A1 | 10/2018 | Disaro' et al. | |
| 2019/0063352 A1 * | 2/2019 | McKay | F02M 25/0836 |
| 2020/0072105 A1 * | 3/2020 | Korenaga | F01N 3/2026 |
| 2020/0240307 A1 * | 7/2020 | Matsumura | B01D 53/94 |
| 2022/0349328 A1 * | 11/2022 | Cox | F01N 3/2026 |
| 2023/0109112 A1 * | 4/2023 | Svraka | F01N 9/00 |
| | | | 60/274 |

FOREIGN PATENT DOCUMENTS

| | | |
|---|---|---|
| DE | 102017213004 A1 | 1/2019 |
| DE | 102020005209 A1 | 10/2020 |
| DE | 102020100529 A1 | 7/2021 |
| EP | 3375994 A1 | 9/2018 |
| FR | 3100839 A1 | 3/2021 |
| FR | 3102210 A1 | 4/2021 |
| GB | 2576890 A | 3/2020 |

* cited by examiner

METHOD FOR PRECONDITIONING AT LEAST A PART OF AN ENGINE SYSTEM OF A VEHICLE

TECHNICAL FIELD

The present invention relates to a method for preconditioning at least a part of an engine system of a vehicle, the engine system comprising an engine and an exhaust aftertreatment system. The invention further relates to a controlling apparatus for a vehicle, to a vehicle, and to a computer program.

BACKGROUND

A vehicle typically comprises an engine for propelling the vehicle. The engine may be an internal combustion engine powered by e.g. liquid or gaseous fuel, or it may be an electric machine powered by electricity. Moreover, hybrid solutions exist in which the vehicle is propelled both by an internal combustion engine and an electric machine.

In case the engine is a combustion engine, such as a diesel engine, it is common to provide the vehicle with an exhaust aftertreatment system, EATS, to handle emissions from the engine. An EATS for a diesel engine typically includes one or more of the following components: a diesel oxidation catalyst, DOC, a diesel particulate filter, DPF, and a selective catalytic reduction SCR catalyst. A reductant, such as urea or an ammonia comprising substance, is typically injected upstream of the SCR catalyst to assist in converting nitrogen oxides, also referred to as NOx, with the aid of a catalyst into diatomic nitrogen, N2, and water, and potentially carbon dioxide CO2 (depending on the choice of the reductant). The cleaned, or at least emission reduced, exhaust gases then leaves the EATS and the vehicle through the tailpipe of the vehicle. Other types of engines causing at least partly similar emissions as the diesel engine may utilize the same, or a similar, EATS.

Government regulations, together with a constant demand for increased fuel economy of the vehicle, implies a need for a more efficient operation of the EATS. For example, the EATS must heat up fast and have a high conversion efficiency also at very low loads, and at cold-start of the engine when the temperature of the exhaust gases is low. The need of very efficient engines for meeting stringent CO2-requirements also leads to lower temperature of the exhaust gases and higher engine out NOx-levels which requires large amounts of reductant to be injected upstream the SCR catalyst. Furthermore, when using urea as the reductant, the urea requires heat to evaporate and hydrolyse into ammonia. If the temperature is low, e.g. during cold-start of the engine, there is a large risk for creating crystallization and deposits that reduce the effect of the EATS.

Prior to operation of the vehicle, the engine and/or the EATS, commonly referred to as an engine system, may be preconditioned. In some examples, the preconditioning of the engine system is performed by heating a component or sub-system of the engine system in order to increase the temperature thereof to be closer to its operating temperature prior to operation of the vehicle. For example, the user of the vehicle, i.e. the vehicle operator, or a system of the vehicle, may require information regarding the need for preconditioning. Such preconditioning information is typically retrieved by requesting a preconditioning status of the particular component or system. Based on the preconditioning status, the user of the vehicle, or the system of the vehicle, may initiate preconditioning.

The preconditioning requires energy, especially preconditioning of the engine and/or EATS, as such systems constitutes large thermal buffers of the vehicle. As the available energy or power is either limited, e.g. when the vehicle is not subject to charging or fuelling, and/or is associated with a cost or an environmental impact, reducing the energy consumption of the vehicle is a common desire. There is thus a need in the industry for an improved preconditioning of the engine system to reduce emissions from the vehicle.

SUMMARY

It is an object of the present invention to at least partly alleviate the shortcomings discussed above in relation to known engine systems comprising an exhaust aftertreatment system, and to improve the preconditioning of at least a part of the engine system.

According to a first aspect of the present invention, a method for preconditioning at least a part of an engine system of a vehicle, the engine system comprising an engine and an exhaust aftertreatment system, EATS, is provided. The method comprises:
  providing predicted vehicle operational information comprising a vehicle operational initialization time and predicted engine operation,
  determining whether or not cold-start emissions of the predicted engine operation achieves a threshold criterium,
  in response to achieving the threshold criterium, preconditioning at least a part of the engine system such that at least said part of the engine system is preconditioned at a time of the vehicle operational initialization time.

Hereby, predicted vehicle operational information can be used to improve the operation of the engine system so that the exhaust aftertreatment system is operated in an improved manner. By relating the cold-start emissions to the predicted engine operation of the predicted vehicle operational information, preconditioning of at least said part of the engine system can be performed in response to the vehicle operational information on the basis that the cold-start emissions of the predicted engine operation achieves the threshold criterium. Thus, preconditioning of at least said part of the engine system is based on cold-start emissions of the predicted engine operation. Hereby, unnecessary preconditioning of the engine system can be reduced or even avoided.

The cold-start emissions typically comprises undesired compounds (such as NOx, particles, and CO or unburned HC) in the exhaust as a result of a cold-start of the engine system, and by preconditioning at least said part of the engine system, such cold-start emission can be reduced. Thus, by preconditioning at least said part of the engine system, cold-start emission can be reduced and emission reduced exhaust gases can leave the exhaust aftertreatment system through the tailpipe of the vehicle. By using predicted vehicle operational information comprising operational initialization time and predicted engine operation, the timing of the preconditioning of at least said part of the vehicle system can be set in response to the operational initialization time, and the cold-start emission impact of the predicted engine operation can be compared to the impact of preconditioning at least said part of the engine system such that at least said part of the engine system is preconditioned at a time of the vehicle operational initialization time in response to achieving the threshold criterium. Hereby, the operation of the engine system, and the preconditioning thereof, can be improved as measures can be taken to respond to the cold-start emission of the predicted engine operations.

According to at least one example embodiment, preconditioning is performed up to 30 minutes prior to the operational initialization time. Hereby, a sufficient preconditioning of at least said part of the engine system can be achieved. For example, preconditioning is performed up to 20 minutes, or up to 10 minutes prior to the operational initialization time. Thus, for example, preconditioning is performed between 0-30 minutes, such as between 0-20 minutes, or between 0-10 minutes prior to the operational initialization time. According to another example, preconditioning is performed between 1 minute and 30 minutes, such as between 1 minute and 20 minutes, or between 1 minute and 10 minutes prior to the operational initialization time. According to at least one example embodiment, the timing, or start, of the preconditioning is set in response to at least said part of the engine system that is subject to the preconditioning. That is, for a part of the engine system which requires a more extensive preconditioning, the timing, or start, of the preconditioning can be set to be relatively long before the operational initialization time, e.g. 30 minutes, as compared to a part of the engine system which requires a less extensive preconditioning.

According to at least one example embodiment, the method comprises, in response to achieving the threshold criterium, preconditioning at least a part of the engine system in accordance with the predicted vehicle operational information such that at least said part of the engine system is preconditioned in accordance with the predicted engine operation at a time of the vehicle operational initialization time.

Hereby, the preconditioning, such as the level of preconditioning, is performed in response to the predicted vehicle operational information. That is, the preconditioning, or the level of preconditioning, is performed in response to the predicted engine operation as the predicted engine operation is used as input to determine the cold-start emissions. Hereby, the cold-start emission impact of the predicted engine operation can be better compared to the impact of preconditioning at least said part of the engine system.

According to at least one example embodiment, achieving the threshold criterium corresponds to exceeding or reaching the threshold criterium. Thus, for example, the method may comprise:
 determining whether or not cold-start emissions of the predicted engine operation exceeds, or reaches, the threshold criterium,
 in response to exceeding, or reaching, the threshold criterium, preconditioning at least a part of the engine system such that at least said part of the engine system is preconditioned at a time of the vehicle operational initialization time.

According to at least one example embodiment, the predicted vehicle operational information is based on historical or statistical data of the vehicle operation, or is scheduled vehicle operational information based on a pre-determined planned vehicle operation.

Hereby, various types of the vehicle information can be used as input data to determine the predicted vehicle operational information. That is, historical or statistical data of the vehicle operation is used as input data to determine the predicted vehicle operational information, or pre-determined planned vehicle operation is used as input to determine scheduled vehicle operational information. Stated differently, the predicted vehicle operational information is determined in response to historical or statistical data of the vehicle operation, or is scheduled vehicle operational information determined in response to pre-determined planned vehicle operation. For example, the historical time-span which the vehicle is operated, and/or the historical weekdays which the vehicle is operated e.g. related to the historical vehicle route, may be statistically used as input data to the predicted vehicle operational information. Additionally or alternatively, external parameters such as predicted road, traffic and/or weather conditions for the predicted vehicle operational information may be used to determine e.g. vehicle operational initialization time and/or predicted engine operation. For the scheduled vehicle operational information, scheduled initialization time of the vehicle may correspond to vehicle operational initialization time, and scheduled operational load of the engine may correspond to the predicted engine operation. For example, a vehicle or transportation planner system may be used as input data to the pre-determined planned vehicle operation and the scheduled vehicle operational information. Additionally or alternatively, external parameters such as predicted road, traffic and/or weather conditions for the scheduled vehicle operational information may be used to determine e.g. scheduled initialization time and/or scheduled operational load of the engine. According to at least one example embodiment, the scheduled vehicle operational information comprises a scheduled route of the vehicle, and possibly scheduled auxiliary actions of performing work during at least a portion of the scheduled route.

According to at least one example embodiment, the predicted vehicle operational information represents future, expected, or scheduled operation of the vehicle (i.e. at least the future, expected or scheduled vehicle initialization time and the future, expected or scheduled engine operation). The predicted vehicle operational information is typically corresponding to the precited initial operation of vehicle, e.g. up to the operating temperature of the engine system has been reached. That is, the predicted vehicle operational information is typically corresponding to the predicted operation of vehicle up to a point in time at which no longer any cold-start emissions are emitted from the vehicle (i.e. without any preconditioning of the engine-system). The predicted vehicle operational information may e.g. be predicted information in the near future of the vehicle operational initialization time, over a time span of e.g. 0 s or 1 s to 30 min, or 0 s or 1 s to 20 min, or 0 s or 1 s to 15 min. Thus, the predicted engine operation may be determined for the initial operation of the vehicle, e.g. by that the engine operational load is determined during such initial operation of the vehicle. Thus, and according to at least one example embodiment, the cold-start emissions of the predicted engine operation is predicted over such initial operation of the vehicle, as described later.

According to at least one example embodiment, the predicted vehicle operational information comprises preview information of the vehicle operation including at least an upcoming road event, wherein the predicted engine operation comprises predicted engine speed and/or predicted engine torque in response to the upcoming road event, and wherein the cold-start emissions of the predicted engine operation is based on the cold-start emissions associated with the predicted engine speed and/or predicted engine torque.

Hereby, the prediction or estimation of the cold-start emissions of the predicted engine operation can be made more accurate. Thus, the predicted engine operation is typically associated with the upcoming road event. The preview information may be determined in response to at least the historical or statistical data of the vehicle operation, or the pre-determined planned vehicle operation, as previously described. Moreover, any external parameters such as predicted road, traffic and/or weather conditions as previously described may be included in the preview information. The predicted engine speed and/or predicted engine torque are important parameters of the engine operation, influencing e.g. fuel consumption, vehicle speed, emissions out from the engine and/or emissions (such as cold-start emissions) out from the exhaust aftertreatment system. Thus, by the preview information and at least the predicted engine speed and/or predicted engine torque, the operation of the exhaust aftertreatment system may be improved by acting in response to such preview information.

According to at least one example embodiment, the preview information is related to future, expected or scheduled operation of the vehicle, typically predicted to occur in the near future, typically over the initial operation of the vehicle as previously discussed. The preview information of the vehicle operation is based on an upcoming road event, such as e.g. upcoming topology of the road (e.g. a downhill or uphill) and/or upcoming road curves and/or upcoming road conditions. The upcoming road event may additionally or alternatively include upcoming parking lots or upcoming traffic lights or expected traffic jams, i.e. at least partly determined by the previously described external parameters. For any such upcoming road event, the operation of the vehicle is typically associated with a corresponding engine operation, i.e. a future, expected or scheduled engine operation in response to the upcoming road event. For example, if the upcoming road event comprises a parking lot in which the vehicle is to be parked, the engine operation associated with such upcoming parking lot may e.g. be predicted engine shut-off, as the vehicle is to be parked in the parking lot (other engine operations associated with such upcoming parking lot may be predicted reduced engine speed and predicted downshifting prior to the predicted engine shut-off). Another example of an upcoming road event is an upcoming uphill. The engine operation association with such upcoming uphill may e.g. be predicted downshifting and/or predicted increased engine torque, as the vehicle is to drive uphill with e.g. a maintained speed or at a speed resulting in a desired balance between vehicle speed and fuel consumption. A third example of an upcoming road event is continuous driving on a high-way, typically preceded by a quick acceleration to reach the vehicle speed of the high-way. Any such predicted vehicle operation can be used to determine predicted engine speed and/or predicted engine torque, and thus the related cold-start emission.

According to at least one example embodiment, determining whether or not cold-start emissions of the predicted engine operation achieves a threshold criterium comprises comparing estimated cold-start emissions associated with predicted engine operation with and without preconditioning of at least said part of the engine system.

Hereby, the cold-start emissions impact of the predicted engine operation without any preconditioning of the engine system can be compared to the cold-start emissions impact of the predicted engine operation with preconditioning of at least said part of the engine system. According to at least one example embodiment, the cold-start emissions impact of the predicted engine operation with preconditioning of at least said part of the engine system comprises any equivalent emissions related to the energy used for preconditioning, e.g. any $CO_2$ equivalent emissions related to the electricity used for the preconditioning of at least said part of the engine system. Hereby, the operation of the engine system, and the preconditioning thereof, can be improved as measures can be taken to respond to the cold-start emission of predicted engine operations with and without said preconditioning.

According to at least one example embodiment, the threshold criterium is a reduced cold-start emission of the predicted engine operation with preconditioning of at least said part of the engine system.

Hereby, a simple yet efficient way to set the threshold criterium to determine whether or not preconditioning of at least said part of the engine system is motivated with regards to cold-start emissions is provided. Thus, if it is determined that the cold-start emissions associated with the predicted engine operation with preconditioning of at least said part of the engine system is lower than the cold-start emissions associated with the predicted engine operation without such preconditioning of at least said part of the engine system, the threshold criterium is achieved. As previously mentioned, the cold-start emissions impact of the predicted engine operation with preconditioning of at least said part of the engine system may comprise any equivalent emissions related to the energy used for preconditioning.

According to at least one example embodiment, the cold-start emissions of the predicted engine operation are estimated from the vehicle operational initialization time to a time at which the engine system has reached its operating temperature.

Hereby, a simply yet efficient way to define the cold-start emissions is provided. Thus, the end point in time of determining the cold-start emissions relates to the predicted vehicle operational information corresponding to the pre-cited initial operation of vehicle as previously described. Thus, the cold-start emissions may be determined in response to a time span of 0 s or 1 s to 30 min, or 0 s or 1 s to 20 min, or 0 s or 1 s to 15 min.

According to at least one example embodiment, the operational initialization time is triggered by a vehicle operator being in the vicinity of the vehicle.

Hereby, the operational initialization time may be substantiated, or given an additional criterium, by that the vehicle operator is in the vicinity of the vehicle. Thus, the historical or statistical data of the vehicle operation, or the scheduled vehicle operational information based on the pre-determined planned vehicle operation, may be supplemented with the criterium that the vehicle operator is in the vicinity of the vehicle at least for the vehicle operational initialization time. According to at least one example embodiment, that the vehicle operator is in the vicinity of the vehicle is included in the threshold criterium. Hereby, unnecessary preconditioning, or at least preconditioning that is initiated too early, can be reduced or even avoided. The trigger that the vehicle operator is in the vicinity of the vehicle may e.g. be in response to that the smart phone of the vehicle operator, or the vehicle key, is within 500 m or 1000 m of the vehicle, or that the vehicle operator enters an area at which the vehicle is parked, e.g. by swiping an access card to get access to said area.

According to at least one example embodiment, preconditioning comprises thermally preconditioning at least a part of the engine system.

That is, at least said part of the engine system is thermally preconditioned in response to achieving the threshold criterium. By thermal preconditioning, the temperature of the engine system, or at least said part of the engine system can be brought closer to the operating temperature thereof, and thus the cold-start emissions can be reduced or even omitted.

According to at least one example embodiment, the engine is thermally preconditioned. Herby, the engine can be brought closer to the operating temperature thereof. According to at least one example embodiment, the EATS, or at least a part of EATS, such as a specific component of the EATS, is thermally preconditioned. Hereby, the EATS (or part or component thereof) can be brought closer to the operating temperature thereof.

According to at least one example embodiment, thermally preconditioning comprises heating at least said part of the engine system by means of combustion or by means of an electrical heating element.

Hereby, a simply yet efficient way of thermally preconditioning at least said part of the engine system is provided. The engine system may e.g. comprise a burner, or a mini burner, which is configured to thermally precondition, or heat, at least said part of the engine system by means of combustion. Alternatively, the engine is used for providing a pre-combustion used for thermally precondition, or heat, at least said part of the engine system. Alternatively, the engine system comprises an electrical heating element arranged and configured in the engine system to thermally precondition, or heat, at least said part of the engine system by means of electrical heating.

According to at least one example embodiment, the engine system comprises an exhaust gas recirculation, EGR, arrangement wherein preconditioning at least said part of the engine system comprises thermally preconditioning at least a part of the EGR arrangement.

Hereby, a simply yet efficient way of thermally preconditioning at least said part of the engine system is provided. The EGR arrangement may e.g. be thermally preconditioned by means of combustion or by means of an electrical heating element, as previously described. For example, an electrical heating element may be arranged in the EGR arrangement, such as in an EGR fluid channel of the EGR arrangement, to heat the recirculated exhaust gases.

According to at least one example embodiment, the engine system comprises a rechargeable energy storage system, RESS, and/or a fuel cell system, wherein preconditioning at least said part of the engine system comprises thermally preconditioning the RESS and/or the fuel cell system.

Hereby, the RESS, and/or a fuel cell system can be thermally preconditioned to improve the performance thereof. Thus, by operating the RESS, and/or a fuel cell system in a favourable manner, cold-start emissions related to the operation of the RESS and/or fuel cell system without such preconditioning, can be reduced. Thus, the vehicle may be an electric vehicle or a hybrid vehicle comprising an electric machine for propelling the vehicle in addition to the engine. The electric machine being powered by the RESS, and/or a fuel cell system.

Moreover, the preconditioning of the RESS, and/or a fuel cell system can be determined in response to whether or not the energy efficiency of the RESS, and/or a fuel cell system increases with preconditioning. For example, the energy used for preconditioning the RESS and/or a fuel cell system can be compared with the increased energy efficiency if the preconditioning of the RESS and/or a fuel cell system is achieved. Thus, such criterium for preconditioning the RESS, and/or a fuel cell system may be used in addition to that another part of the engine system is preconditioned in response to achieving the threshold criterium, as previously described.

According to at least one example embodiment, preconditioning of the RESS, and/or a fuel cell system is combined with preconditioning of at least another part of the engine system, such as e.g. the engine or EATS.

According to at least one example embodiment, the EATS comprises a selective catalytic reduction, SCR, catalyst, having an ammonia storage, wherein preconditioning at least said part of the engine system comprises preconditioning the SCR catalyst to a pre-determined level of ammonia storage and/or thermally preconditioning the SCR catalyst to a pre-determined temperature.

Hereby, the SCR catalyst can be preconditioned in an advantageous manner. For example, by thermally preconditioning the SCR catalyst, the SCR catalyst can be brought closer to its operating temperature at the vehicle operational initialization time. Correspondingly, by preconditioning the SCR catalyst to a pre-determined level of ammonia storage, the SCR catalyst can be brought closer to its operating condition at the vehicle operational initialization time.

According to at least one example embodiment, for embodiments comprising preconditioning the SCR catalyst to a pre-determined level of ammonia storage, the engine system comprises a flow inducing means configured to induce a flow in at least the EATS. Hereby, any injected ammonia, e.g. in the form of a reductant such as UREA, can be transported from the injection point and into the SCR catalyst when the engine is shut-off. The flow inducing means is e.g. a fan or a gas injection to the EATS, e.g. coupled to a gas source. According to at least one example embodiment, a current level of ammonia storage in the SCR catalyst is determined, and UREA or another reductant is injected to meet an ammonia storage threshold level using the flow inducing means. According to at least one example embodiment, the reductant is anhydrous ammonia, aqueous ammonia, aqueous urea or a diesel exhaust fluid comprising ammonia.

According to a second aspect of the invention, a controlling apparatus for a vehicle comprising an engine system, the engine system comprising an engine and an exhaust aftertreatment system, EATS, is provided. The controlling apparatus is configured to:
- provide predicted vehicle operational information comprising a vehicle operational initialization time and predicted engine operation,
- determine whether or not cold-start emissions of the predicted engine operation achieves a threshold criterium,
- in response to achieving the threshold criterium, precondition at least a part of the engine system such that at least said part of the engine system is preconditioned at a time of the vehicle operational initialization time.

Effects and features of the second aspect of the invention are largely analogous to those described above in connection with the first aspect of the invention. Embodiments mentioned in relation to the first aspect of the invention are largely compatible with the second aspect of the invention, of which some are exemplified below.

Thus, the controlling apparatus may be configured to thermally precondition at least said part of the engine system by means of e.g. heating by combustion or an electrical heating element. Thus, the controlling apparatus is typically configured to operate a combustion unit and/or the electrical heating element. Moreover, the controlling apparatus may be configured to precondition an SCR catalyst or the engine system to a pre-determined level of ammonia storage. Thus, the controlling apparatus is typically configured to operate an injector to inject a reductant to the EATS, and to operate a fan or compressor for inducing a fluid flow for bringing the reductant into the SCR catalyst. Stated differently, the controlling apparatus may be configured to instruct the engine system to perform at least the step of preconditioning at least a part of the engine system.

The controlling apparatus may e.g. be, or be comprised in, an electrical control unit (ECU) of the vehicle.

According to at least one example embodiment, the controlling apparatus is configured to perform the method steps according to any of the embodiments mentioned in relation to the first aspect of the invention.

According to a third aspect of the invention a vehicle comprising an engine system and a controlling apparatus according to the second aspect of the invention is provided. The engine system comprises an engine, such as e.g. a diesel engine, and an exhaust aftertreatment system, EATS. Other types of engines causing similar emissions as the diesel engine may utilize the same, or a similar, EATS.

According to at least one example embodiment, the vehicle is a hybrid vehicle comprising an electric machine for propelling the vehicle in addition to the engine.

Hereby, the operational time, or power, of the engine (typically a diesel engine) can be reduced. Moreover, for at least some vehicle operations, the engine may be shut-off, and the vehicle may be propelled solely by the electric machine. Typically, the vehicle comprises energy storage or transformation devices, such as batteries or fuel cells, for powering the electric machine.

According to a fourth aspect of the invention, a computer program comprising program code means for performing the method according to the first aspect of the invention, when the program is run on a computer, is provided. Thus, the program code means comprises instructions to cause the engine system to execute at least the step of preconditioning at least a part of the engine system.

According to a fifth aspect of the invention, a computer readable medium carrying a computer program comprising program code means for performing the method according to the first aspect of the invention, when the program is run on a computer, is provided. Thus, the program code means comprises instructions to cause the engine system to execute at least the step of preconditioning at least a part of the engine system.

Effects and features of the third to fifth aspects of the invention are largely analogous to those described above in connection with the first and second aspects of the invention. Embodiments mentioned in relation to the first aspect of the invention are largely compatible with the third to fifth aspects of the invention.

The order of the method steps described in the first aspect of the invention and implemented in the some of the other aspects of the invention, is not constrained to that described in the present disclosure. One or several of the steps could switch places or occur in a different order without departing from the scope of the invention. However, according to at least one example embodiment, the method steps are performed in the consecutive order described in the first aspect of the invention.

According to at least one example embodiment, applicable to any one of the first to fifth aspects of the invention, the EATS of the engine system is configured for converting NOx emissions in the exhaust gases from an engine of a vehicle, e.g. a heavy duty truck. The EATS may be used for cleaning exhaust gases from various types of engines, such as e.g. diesel engines or hydrogen engines. For example, the present EATS may be used to clean exhaust gases by converting NOx emissions from the exhausts of internal combustion engines based on CNG (Compressed Natural Gas), LPG (Liquified Pressurized Gas), DME (DiMethylEther), and/or H2 (Hydrogen).

According to at least one example embodiment, the engine of the engine system is a hydrogen engine of a vehicle, wherein the EATS of the engine system is configured for converting NOx emissions in the exhaust gases from the hydrogen engine. For such an embodiment, the EATS may further comprise a particulate filter configured to filter particles in the exhausts. Such particulate filter is advantageously arranged upstream of the SCR catalyst.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
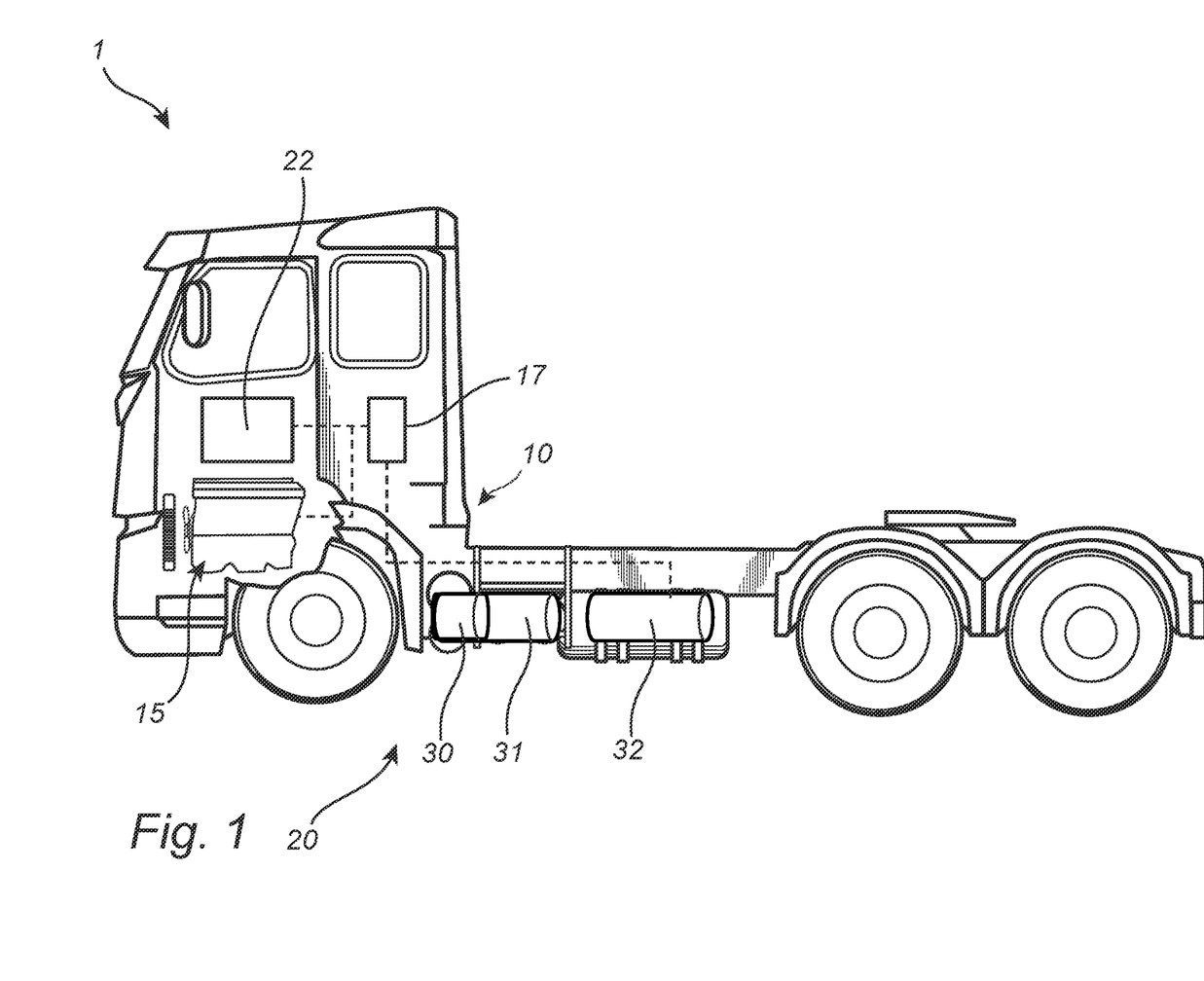
FIG. 1 is a schematic side view of a vehicle comprising an engine system and a controlling apparatus in accordance with an example embodiment of the invention.

With reference to FIG. 1 a vehicle 1, here embodied as a heavy duty truck 1, comprising an engine system 10 is disclosed for which a controlling apparatus 17 of a kind disclosed in the present disclosure is advantageous. However, the controlling apparatus 17 may as well be implemented in other types of vehicles, such as in busses, lightweight trucks, passenger cars, marine applications etc having similar engine systems. The vehicle 1 of FIG. 1 is a hybrid vehicle 1 comprising an engine 15, being a diesel engine 15, and an electric machine 22. The diesel engine 15 is powered by diesel fuel, typically comprised in a fuel tank (not shown) and the electric machine 22 is powered by electricity supplied from at least one energy storage or transformation device, e.g. a battery or a fuel cell. The diesel engine 15 and the electric machine 22 are typically arranged and configured to individually propel the vehicle 1, by being separately coupled to other parts of the powertrain of the vehicle 1, such as transmission, drive shafts and wheels (not shown in detail). That is, the vehicle 1 may be propelled by the diesel engine 15 alone, the electric machine 22 alone, or by the diesel engine 15 together with the electric machine 22.

In FIG. 1, at least the diesel engine 15 is comprised in the engine system 10, the engine system 10 further comprising an exhaust aftertreatment system, EATS, 20 having at least an SCR catalyst 32, a particle filter in the form of a DPF 31 and a DOC 30. The DPF 31 is arranged upstream of the SCR catalyst 32, and is arranged and configured to remove particles, i.e. diesel particulate matter or soot, from the exhaust gas of the diesel engine 15. The SCR catalyst 32 is arranged and configured to convert nitrogen oxides, also referred to as NOx, with the aid of a catalyst, into diatomic nitrogen (N2), and water (H2O) (and potentially carbon dioxide CO2). A reductant, typically anhydrous ammonia, aqueous ammonia or urea solution (commonly referred to as urea in the present disclosure), is added to engine exhausts and is absorbed onto the catalyst in the SCR catalyst 32. The DOC 30 is arranged upstream of the DPF 31 and is configured to convert carbon monoxide and hydrocarbons into carbon dioxide. The engine system 10 is described in more detail with reference to FIG. 4.

During initial operation of vehicle, e.g. up to a point in time at which the operating temperature of the engine system has been reached, the emissions (e.g. emissions per travelled distance, or emissions per unit operational time) out of the EATS are typically higher compared to when the operating temperature of the engine system has been reached. Such emissions are referred to as cold-start emissions and they typically comprises undesired compounds (such as NOx, particles, and CO or unburned HC) in the exhaust out from the EATS 20 as a result of the cold-start of the engine system. The initial operation of the vehicle may e.g. span over the near future to the vehicle operational initialization time, e.g. over a time span of e.g. 0 s or 1 s to 30 min, or 0 s or 1 s to 20 min, or 0 s or 1 s to 15 min. Thus, the cold-start emissions of the vehicle are the emissions in the exhausts out from the EATS 20 during such initial operation of the vehicle. In order to avoid, or at least reduce, such cold-start emissions, at least a part of the engine system 10 may be preconditioned. That is, at least a part of the engine system 10 may be prepared in such a way that the emissions during the initial operation of the vehicle is reduced.

Figure 2:
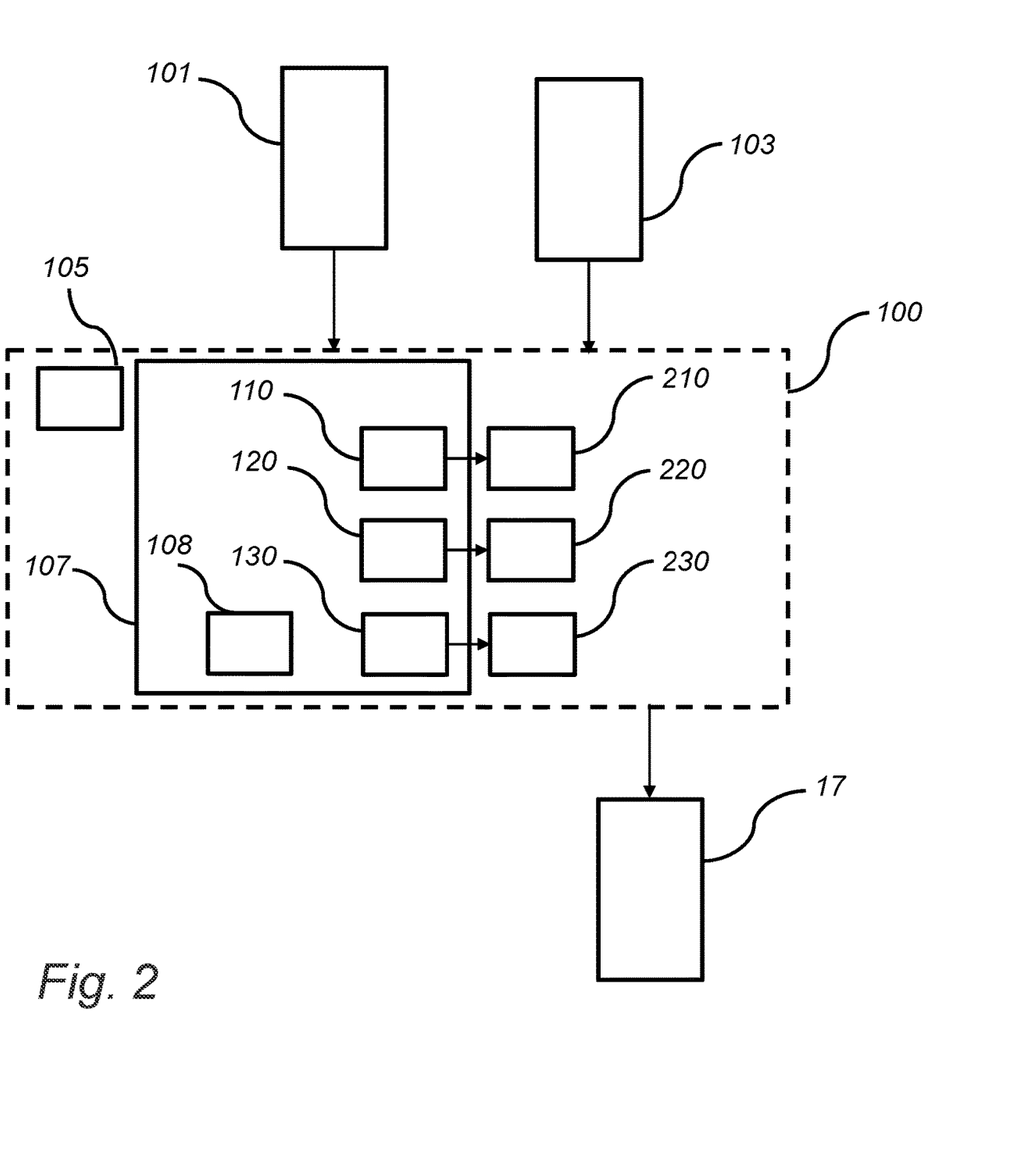
FIG. 2 shows a schematic example of predicted vehicle operational information comprising a vehicle operational initialization time and predicted engine operation, applicable to example embodiments of the invention

The controlling apparatus 17 of the vehicle 1 is configured to control the preconditioning of at least a part of the engine system 10, i.e. at least a part of the diesel engine 15 and/or at least a part of the EATS 20. In more detail, and as shown in FIG. 2, the controlling apparatus 17 is configured to receive or provide predicted vehicle operational information 100 comprising a vehicle operational initialization time 105 and predicted engine operation 210, 220, 230. The predicted vehicle operational information 100 may e.g. be based on historical or statistical data 101 of the vehicle operation, or is scheduled vehicle operational information based on a pre-determined planned vehicle operation 103. That is, according to at least one example embodiment, the predicted vehicle operational information 100 is scheduled vehicle operational information.

The predicted vehicle operational information 100 may comprise preview information 107 of the vehicle operation including at least an upcoming road event 110, 120, 130 (such as a first upcoming road event 110, a second upcoming road event 120 and a third upcoming road event 130). Typically the upcoming road event 110, 120, 130 is associated with the predicted engine operation 210, 220, 230 (typically a corresponding first predicted engine operation 210, a second predicted engine operation 220 and a third predicted engine operation 230). The predicted engine operation 210, 220, 230 typically comprises predicted engine speed and/or predicted engine torque, determined in response to the upcoming road event 110, 120, 130. The preview information may further comprise at least one external parameter 108 such as predicted road, traffic and/or weather conditions of the predicted vehicle operation, e.g. associated with, or comprised in, each of the upcoming road events 110, 120, 130.

The controlling apparatus 17 is further configured to determine whether or not cold-start emissions of the predicted engine operation 210, 220, 230 achieves a threshold criterium. The cold-start emissions of the predicted engine operation 210, 220, 230 are preferably based on the cold-start emissions associated with the predicted engine speed and/or predicted engine torque. The cold-start emissions are for example determined or estimated from the vehicle operational initialization time 105 to a time at which the engine system 10 has reached its operating temperature.

Moreover, the controlling apparatus 17 is further configured to, in response to achieving the threshold criterium, precondition at least a part of the engine system 10 in accordance with the predicted vehicle operational information 100 such that at least said part of the engine system 10 is preconditioned in accordance with the predicted engine operation 210, 220, 230 at a time of the vehicle operational initialization time 105. For example, the threshold criterium may be based on a comparison of estimated cold-start emissions associated with predicted engine operation 210, 220, 230 with and without preconditioning of at least said part of the engine system 10. Typically, the threshold criterium is a reduced cold-start emission of the predicted engine operation 210, 220, 230 with preconditioning of at least said part of the engine system 10. Various alternatives for preconditioning at least said part of the engine system 10 is further described with reference to FIG. 4.

Figure 3:
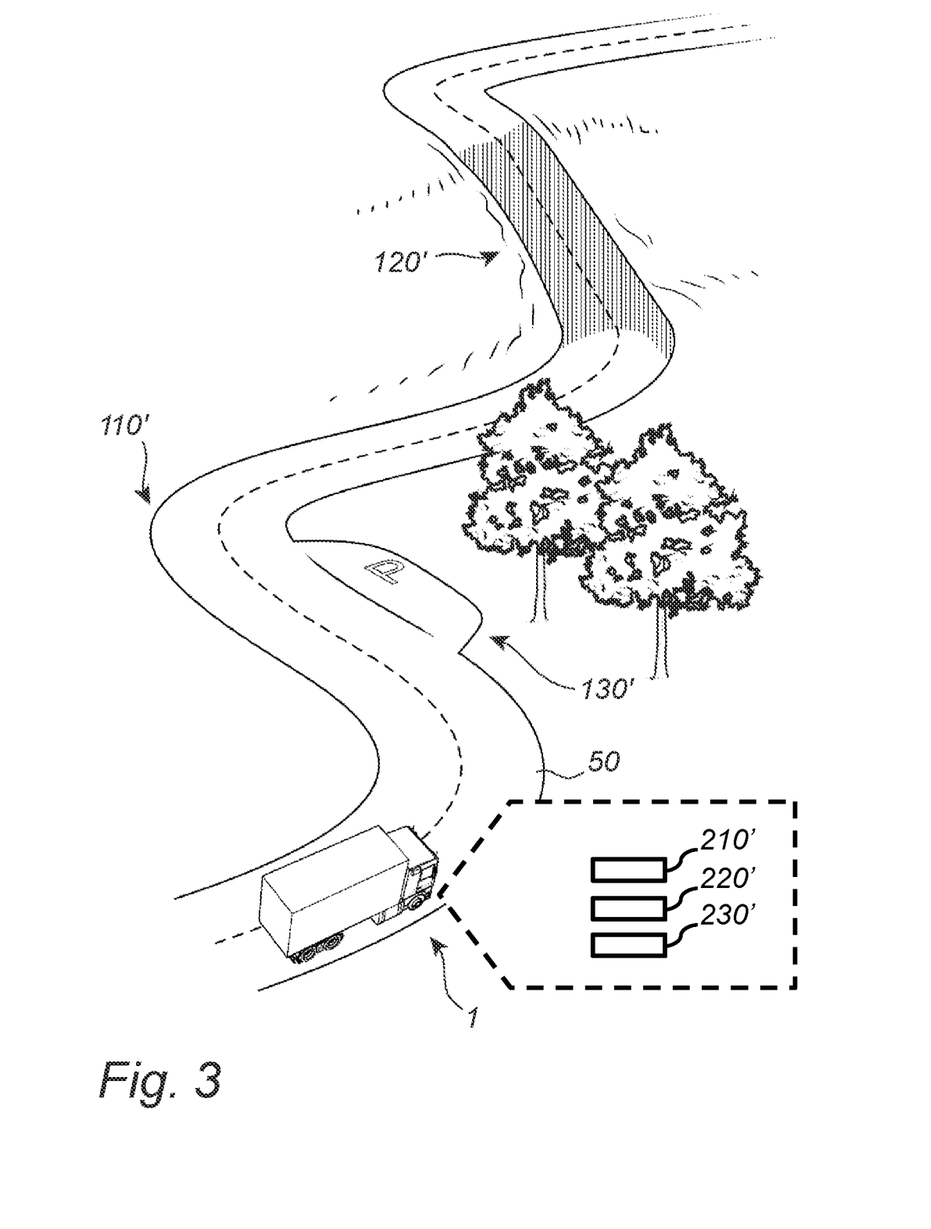
FIG. 3 is a schematic perspective view of a vehicle traveling along a road with upcoming road events, applicable to example embodiments of the invention.

An example embodiment of how predicted vehicle operational information 100 may be used to determine whether or not preconditioning of at least a part of the engine system 10 is to be carried out is described with reference to FIG. 3 and FIG. 2. In FIG. 3, a vehicle 1, such as the hybrid vehicle 1 in FIG. 1, is travelling along a road 50 and is approaching a road curve 110' and uphill 120'. Moreover, a parking lot 130', in which the vehicle 1 may park, is present further down the road 50 on the right hand side of vehicle 1. The road curve 110', the uphill 120' and the parking lot 130' are examples of upcoming road events 110, 120, 130. The upcoming road events 110, 120, 130 may e.g. be determined in response to historical or statistical data 101 of the vehicle operation, or in response to a pre-determined planned vehicle operation 103, e.g. comprising a scheduled route of the vehicle 1. The vehicle 1, and engine system 10, are typically configured to predict (and in use, to adapt) the vehicle operation based on the upcoming road events 110, 120, 130. For example, by acknowledging the uphill 120', and e.g. the length and inclination of the uphill 120', a first predicted engine operation 210 in which the gear is adapted, typically downshifting 210' for increased engine torque, may be determined. In other words, the predicted vehicle operation is at least partly defined by the first predicted engine operation 210 (here downshifting 210'). In a corresponding manner, various upcoming road events may be associated with a corresponding engine operation. The road curve 110' (e.g. being a steep road curve 110') may be associated with a second predicted engine operation 220 of reduced engine speed 220', and the parking lot 130' may be associated with a third predicted engine operation 230 of engine shut-off 230' (the latter e.g. being comprised in a vehicle operation of vehicle off). Other upcoming road events may e.g. be a downhill with the associated predicted engine operation of engine shut-off (the electric machine may still propel the vehicle), or continuous operation on the high-way in a steady-state manner.

The upcoming road events 110, 120, 130 may for example be acquired from map data (comprising e.g. topology data), and may be related to the position of vehicle 1 by means of a GPS or other vehicle localization means. The predicted engine operations 210, 220, 230 are typically related to the upcoming road events 110, 120, 130 by means of models and/or otherwise predicted and required engine operation, known to the skilled person.

Figure 4:
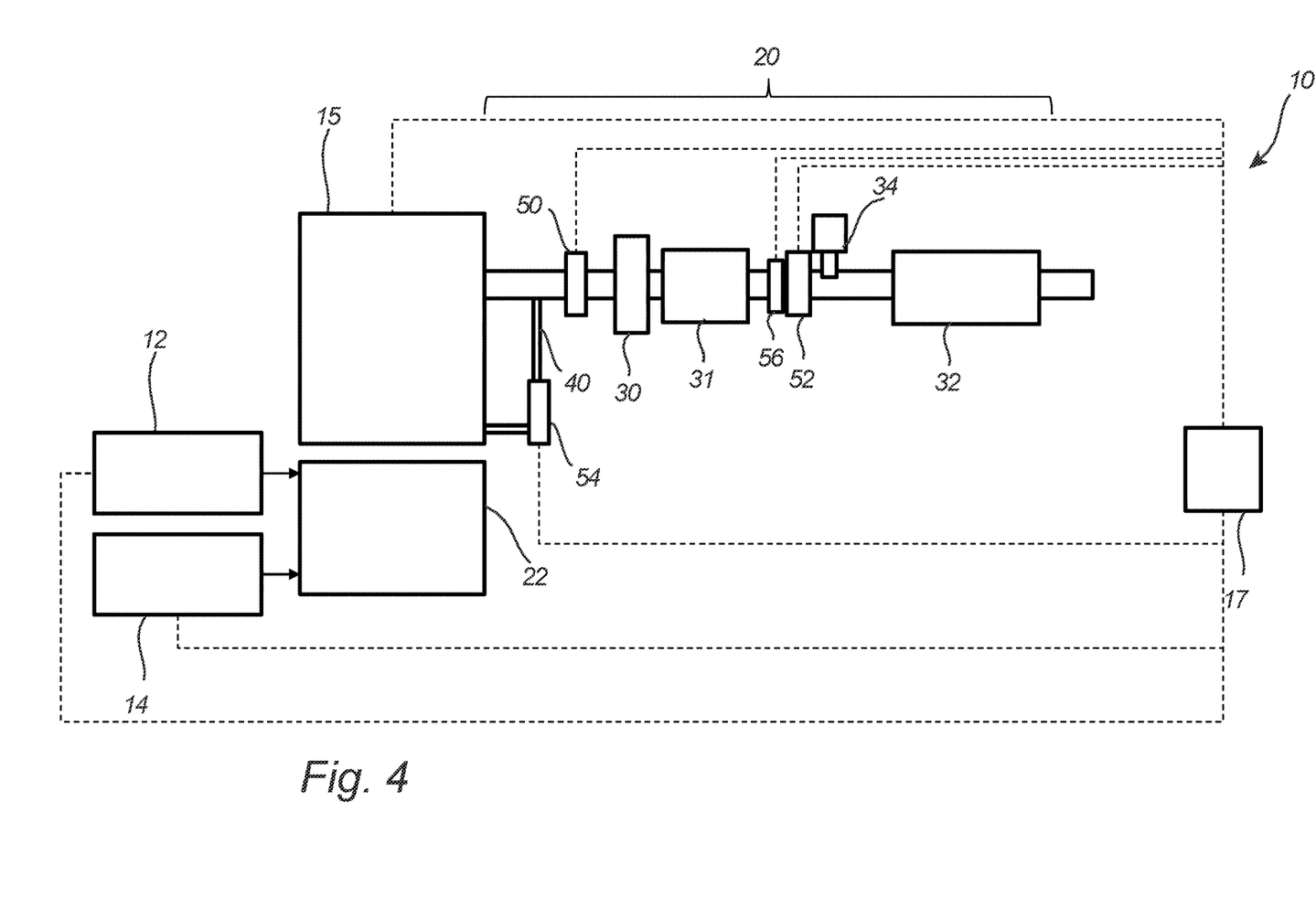
FIG. 4 is schematic view of an engine system of a vehicle in accordance with example embodiments of the invention.

The preconditioning of at least said part of the engine system 10 will now be described with reference to FIG. 4. FIG. 4 discloses the engine system 10 of vehicle 1 of FIG. 1 in more detail. The engine system 10 comprises, as already described with reference to FIG. 1, a diesel engine 15 and an EATS 20 having a DOC 30, a DPF 31 and an SCR catalyst 32, and a controlling apparatus 17 which is configured to control the preconditioning of at least a part of the engine system 10. It should however be mentioned that the controlling apparatus 17 may be provided outside of the engine system 10 and instead being comprised in another part of the vehicle. The EATS 20 further comprises an injector 34 configured to inject a reductant (e.g. urea) upstream of the SCR catalyst 32 providing ammonia for the conversion of nitrogen oxides, NOx, into diatomic nitrogen N2, and water H2O (and potentially carbon dioxide CO2). The engine system 10 further comprises an exhaust gas recirculation, EGR, arrangement 40, for recirculating exhaust downstream of the diesel engine 15 back into the diesel engine 15.

As previously described at least a part of the engine system 10 may be preconditioned in order to reduce the cold-start emissions. For example, the preconditioning may comprise thermally preconditioning at least a part of the engine system 10. Such thermal preconditioning of at least a part of the engine system 10 may be performed by heating by means of combustion or by means of an electrical heating element. For example, and as seen in FIG. 4, heaters 50, 52, 54 are arranged in various positions of the engine system 10. In the example embodiment of FIG. 4, three heaters 50, 52, 54, here being a first heater 50, a second heater 52 and a third heater 54 are arranged in different positions of the engine system 10. However, only one, or two, of the heaters 50, 52, 54 may be provided in the engine system 10. For simplicity, the first, second and third heaters 50, 52, 54 are here referred to as first, second and third electrical heating elements 50, 52, 54, respectively, but they may as well be combustion units configured for combustion of e.g. HC to produce heat. The electrical heating elements 50, 52, 54 are heating elements which are configured to be heated by means of electricity. Each one of the electrical heating elements 50, 52, 54 may e.g. comprise a lattice or a grating, or a coil or a plate, configured to be heated by electricity led through the lattice, grating, coil, or plate. At least one of the electrical heating elements 50, 52, 54 may be of another shape, e.g. in the shape of a flat or curved heating lamella, or comprise a heating element of a different type, e.g. a resistance foam. At least one of the electrical heating elements 50, 52, 54 may be a Positive Temperature Coefficient, PTC, based element, or is based on induction heating and referred to as an induction heating element.

In FIG. 4, the first electrical heating element 50 is arranged directly upstream of the DOC 30. Thus, the first electrical heating element 50 may primarily heat up the DOC 30 and possibly the DPF 31 being arranged relatively close to the DOC 30. Thus, the DOC 30 can be thermally preconditioned by the first electrical heating element 50 by means of the controlling apparatus 17, and thereby be brought closer to the operating temperature of the DOC 30 at the vehicle operational initialization time 105. Hereby, the cold-start emissions can be reduced. For example, the first electrical heating element 50 is arranged within 0.1 to 1.5 m, or 0.1 to 1 m, or 0.1 to 0.5 m of the DOC 30. The second electrical heating element 52 is arranged upstream of the SCR catalyst 32, and directly upstream of the injector 34. Thus, the second electrical heating element 52 may heat up the injector 34 and any mixing box of reductant arranged in fluid communication with the injector 34 as well as the SCR catalyst 32. Thus, the injector 34 and the SCR catalyst 32 can be thermally preconditioned by the second electrical heating element 52 by means of the controlling apparatus 17, and thereby be brought closer to the operating temperature of the injector 34 and SCR catalyst 32 at the vehicle operational initialization time 105. Hereby the cold-start emissions can be reduced. By heating the reductant in the mixing box by preconditioning, the injection of the reductant by the injector 34 may be performed sooner compared to if no preconditioning is performed. In an alternative, or additional, embodiment, the second electrical heating element 52 is arranged directly upstream of the SCR catalyst 32, such as e.g. between the injector 34 and the SCR catalyst 32. For example, the second electrical heating element 52 is arranged within 0.1 to 1.5 m, or 0.1 to 1 m, or 0.1 to 0.5 m of the injector 34 or the SCR catalyst 32. The third electrical heating element 54 is arranged in the EGR arrangement 40. Thus, the third electrical heating element 54 may primarily heat up the EGR arrangement 40, or at least a part of the EGR arrangement 40. It should be noted that the third electrical heating element 54 is schematically illustrated as a box in FIG. 4, but it may as well be an elongated electrical heating element extending along the EGR arrangement 40. Thus, the EGR arrangement 40 can be thermally preconditioned by the third electrical heating element 54 by means of the controlling apparatus 17, and thereby be brought closer to the operating temperature of the EGR arrangement 40 at the vehicle operational initialization time 105. Hereby, the cold-start emissions can be reduced.

As also indicated in FIG. 4, the controlling apparatus 17 is communicatively connected to the diesel engine 15. Thus, the diesel engine 15 may be instructed by the controlling apparatus 17 to perform a pre-combustion used for thermally precondition, or heat, at least the diesel engine 15 of the engine system 10.

According to at least one example alternative embodiment, at least a part of the engine system 10 is preconditioned by other means than the thermal preconditioning previously described. Such preconditioning may for example be used instead of the thermal preconditioning, or as an addition to the thermal preconditioning. In FIG. 4, the engine system 10 comprises a fan or compressor 56, hereafter referred to as a fan 56. The fan 56 is arranged upstream of the injector 34, and in the embodiment in FIG. 4 upstream of the second electrical heating element 52. Preconditioning can thus be performed by operating the fan 56 and thereby inducing a fluid flow in the EATS 20. Hereby, any injected reductant from the injector 34, also performed during preconditioning, can be brought into the SCR catalyst 32 by the induced fluid flow. Hereby the ammonia storage of the SCR catalyst 32 can be improved by the injected reductant, typically to a pre-determined level of ammonia storage. Preferably, the second electrical heating element 52 is also operated during the preconditioning for heating the reductant prior to injection thereof. Thus, both heat, and heated reductant, are brought into SCR catalyst 32 by the fan 56 during preconditioning.

As described with reference to FIG. 1, the engine system 10 may comprise an electric machine 22 powered by electricity supplied from at least one energy storage or transformation device, e.g. a battery or a fuel cell. In FIG. 4 the electric machine 22 is shown as being operable by both a rechargeable energy storage system, RESS 12, comprising at least one battery, and a fuel cell system 14 comprising at least one fuel cell. However, typically only one of the RESS 12 and the fuel cell system 14 is used for powering the electric machine 22. Each one of the RESS 12 and fuel cell system 14 may comprise an integrated heating element (not shown in detail). Thus, the RESS 12 and the fuel cell system 14 can be thermally preconditioned by the respective integrated heating element by means of the controlling apparatus 17, and thereby be brought closer to the operating temperature of the RESS 12 and the fuel cell system 14, respectively, at the vehicle operational initialization time 105. Hereby, the energy efficiency of the RESS 12 and fuel cell system 14 is improved and/or the cold-start emissions can be reduced.

Figure 5:
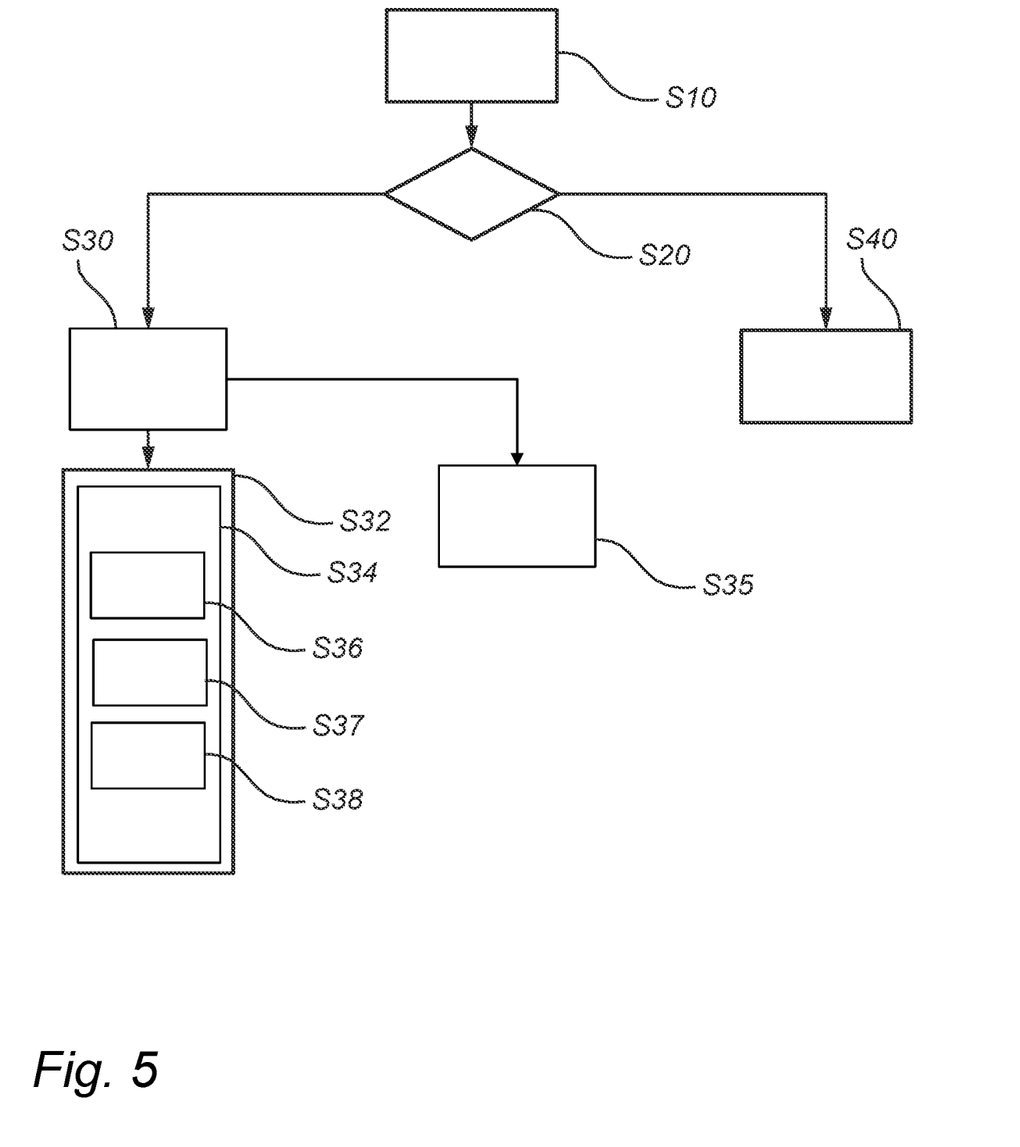
FIG. 5 is a flowchart illustrating the steps of a method in accordance with one example embodiment of the invention.

Turning to the flowchart of FIG. 5, schematically illustrating steps of a method for preconditioning at least a part of an engine system of a vehicle, such as the engine system 10 of FIGS. 1 and 4. Thus, the engine system 10 comprises an engine, e.g. the diesel engine 15 of FIGS. 1 and 4, and an exhaust aftertreatment system, EATS, such as EATS 20 of FIGS. 1 and 4. In the flowchart of FIG. 5, reference is also made to FIGS. 2 and 3 for the predicted vehicle operational information 100 and embodiments thereof.

In a step S10, e.g. being a first step S10, predicted vehicle operational information 100 is provided. The predicted vehicle operational information 100 comprises a vehicle operational initialization time 105 and predicted engine operation 210, 220, 230, as e.g. illustrated in FIG. 2. The predicted vehicle operational information 100 is based on historical or statistical data 101 of the vehicle operation, or is scheduled vehicle operational information based on a pre-determined planned vehicle operation 103, as previously described with reference to FIG. 2. As also described with reference to FIG. 2, the predicted vehicle operational information 100 may comprises preview information 107 of the vehicle operation including at least an upcoming road event 110, 120, 130. The upcoming road event 110, 120, 130 is typically associated with a predicted engine operation 210, 220, 230. Moreover, the predicted engine operation 210, 220, 230 comprises predicted engine speed and/or predicted engine torque in response to the upcoming road event 110, 120, 130. Moreover, the operational initialization time 105 may be triggered by a vehicle operator being in the vicinity of the vehicle 1.

In a step S20, e.g. being a second step S20, it is determined whether or not cold-start emissions of the predicted engine operation 210, 220, 230 achieves a threshold criterium. For example, as described with reference to FIGS. 2-3, the cold-start emissions of the predicted engine operation 210, 220, 230 is based on the cold-start emissions associated with the predicted engine speed and/or predicted engine torque. The cold-start emissions of the predicted engine operation 210, 220, 230 are for example estimated from the vehicle operational initialization time 105 to a time at which the engine system 10 has reached (or is predicted to have reached) its operating temperature. The step S20 of determining whether or not cold-start emissions of the predicted engine operation 210, 220, 230 achieves a threshold criterium typically comprises comparing estimated cold-start emissions associated with predicted engine operation 210, 220, 230 with and without preconditioning of at least said part of the engine system 10. The threshold criterium is typically based on a reduced cold-start emission of the predicted engine operation 210, 220, 230 with preconditioning of at least said part of the engine system.

In a step S30, e.g. being a third step S30, applicable for embodiments in which the threshold criterium of step S20 is achieved, at least a part of the engine system 10 is preconditioned such that at least said part of the engine system 10 is preconditioned at a time of the vehicle operational initialization time 105. In a step S40, being performed as a third step S40 instead of step S30, no preconditioning of at least said part of the engine system 10 is performed as the threshold criterium is not achieved. For example, if it was determined that preconditioning would not result in reduced cold-start emissions considering the predicted vehicle operational information 100. For example, such scenario could be realised if the equivalent emissions related to the preconditioning is larger than the reduced cold-start emissions being a result of the preconditioning.

In a step S32, e.g. being a subsequent step to step S30, at least a part of the engine system 10 is thermally preconditioned. The thermally preconditioning of step S32 may be carried out by heating, as shown by step S34 comprised in the step S32 in FIG. 5. Typically the step S34 of heating is carried out by means of combustion or by means of an electrical heating element, as described e.g. with reference to FIG. 4. For example, and as shown in FIG. 4, the engine system 10 comprises an exhaust gas recirculation, EGR, arrangement 40. Thus, the step of heating S34 may comprise the step S36 of thermally preconditioning at least a part of the EGR arrangement 40 by heating. Additionally, or alternatively, the engine system 10 comprises a rechargeable energy storage system, RESS 12, and/or a fuel cell system 14, as also shown in FIG. 4. Thus, the step of heating S34 may comprise the step S37 of thermally preconditioning the RESS 12 and/or the fuel cell system 14. Additionally, or alternatively, the engine system 10 comprises a selective catalytic reduction, SCR, catalyst 32, as shown in FIG. 4. Thus, the step of heating S34 may comprise the step S38 of thermally preconditioning the SCR catalyst 32. As also described with reference to FIG. 4, other components of the engine system 10, such as the DOC 30, the DPF 31, and/or the injector 34 with the mixing box may be additionally or alternatively thermally preconditioned by heating.

The SCR catalyst 32 typically comprises an ammonia storage. Thus, in a step S35, e.g. being a subsequent step to step S30 and carried out in addition to, or as alternative to, the step S32 of thermally preconditioning, the SCR catalyst 32 is preconditioned to a pre-determined level of ammonia storage. Such preconditioning is typically performed by injecting reductant by the injector 34 and forcing the injected reductant into the SCR catalyst 32 by means of a fan or compressor 56 as described with reference to FIG. 4.

According to at least one example embodiment, the step S32 and the step S35 are carried out simultaneously. Moreover, any one of the steps S36, S37, S38 may be carried out alone or as in combination with at least one other of said steps S36, S37, S38. It should be noted that the naming of the steps is not necessarily, but might according to at least one example embodiment, relate to the order in which the steps are carried out. Thus, the order of the steps may be different than that explained here, unless explicitly being dependent on each other.

It is to be understood that the present invention is not limited to the embodiments described above and illustrated in the drawings; rather, the skilled person will recognize that many changes and modifications may be made within the scope of the appended claims. The present invention is not limited to a certain type of engine system and/or EATS. For example, the EATS 20, or a similar one, may be used for cleaning exhaust gases of other engines than diesel engines. For example, the EATS may be used to clean exhaust gases by converting NOx emissions from the exhaust of internal combustion engines using CNG (Compressed Natural Gas), LPG (Liquified Pressurized Gas), DME (DiMethylEther), and/or H2 (Hydrogen) as fuel. Thus, the engine system may comprise another combustion engine than a diesel engine, e.g. a hydrogen engine.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for preconditioning at least a part of an engine system of a vehicle, the engine system comprising an engine and an exhaust aftertreatment system, EATS, the method comprising:
  providing predicted vehicle operational information comprising a vehicle operational initialization time and predicted engine operation,
  determining whether or not estimated cold-start emissions of the predicted engine operation achieves a threshold criterium,
  in response to achieving the threshold criterium, preconditioning at least a part of the engine system such that at least said part of the engine system is preconditioned at a time of the vehicle operational initialization time,
  wherein determining whether or not the estimated cold-start emissions of the predicted engine operation achieves the threshold criterium comprises comparing the estimated cold-start emissions associated with predicted engine operation with and without preconditioning of at least said part of the engine system, and wherein the threshold criterium is a reduced estimated cold-start emission of the predicted engine operation with preconditioning of at least said part of the engine system; wherein the predicted vehicle operational information further comprises preview information of the vehicle operation including at least an upcoming road event, wherein the predicted engine operation comprises predicted engine speed and/or predicted engine torque in response to the upcoming road event, and wherein the estimated cold-start emissions of the predicted engine operation is based on the estimated cold-start emissions associated with the predicted engine speed and/or predicted engine torque.

2. The method according to claim 1, wherein the predicted vehicle operational information is based on historical or statistical data of the vehicle operation, or is scheduled vehicle operational information based on a pre-determined planned vehicle operation.

3. The method according to claim 1, wherein the estimated cold-start emissions of the predicted engine operation are estimated from the vehicle operational initialization time to a time at which the engine system has reached its operating temperature.

4. The method according to claim 1, wherein the vehicle operational initialization time is triggered by a vehicle operator being in a vicinity of the vehicle.

5. The method according to claim 1, wherein preconditioning comprises thermally preconditioning at least a part of the engine system.

6. The method according to claim 5, wherein the thermally preconditioning comprises heating at least said part of the engine system by means of combustion or by means of an electrical heating element.

7. The method according to claim 5, wherein the engine system comprises an exhaust gas recirculation ("EGR") arrangement, and wherein preconditioning at least said part of the engine system comprises thermally preconditioning at least a part of the EGR arrangement.

8. The method according to claim 5, wherein the engine system comprises a rechargeable energy storage system ("RESS") and/or a fuel cell system, and wherein preconditioning at least said part of the engine system comprises thermally preconditioning the RESS and/or the fuel cell system.

9. The method according to claim 1, wherein the EATS comprises a selective catalytic reduction ("SCR") catalyst, having an ammonia storage, wherein preconditioning at least said part of the engine system comprises preconditioning the SCR catalyst to a pre-determined level of ammonia storage and/or thermally preconditioning the SCR catalyst to a pre-determined temperature.

10. A non-transitory computer readable medium storing program code for performing the method according to claim 1, when the program code is run on a computer.

11. A controlling apparatus for a vehicle comprising an engine system, the engine system comprising an engine and an exhaust aftertreatment system ("EATS") the controlling apparatus being configured to:
  provide predicted vehicle operational information comprising a vehicle operational initialization time and predicted engine operation,
  determine whether or not cold-start emissions of the predicted engine operation achieves a threshold criterium,
  in response to achieving the threshold criterium, precondition at least a part of the engine system such that at least said part of the engine system is preconditioned at a time of the vehicle operational initialization time,
  wherein the controlling apparatus is configured to determine whether or not cold-start emissions of the predicted engine operation achieves the threshold criterium by comparing estimated cold-start emissions associated with predicted engine operation with and without preconditioning of at least said part of the engine system, and wherein the threshold criterium is a reduced cold-start emission of the predicted engine operation with preconditioning of at least said part of the engine system; wherein the predicted vehicle operational information further comprises preview information of the vehicle operation including at least an upcoming road event, wherein the predicted engine operation comprises predicted engine speed and/or predicted engine torque in response to the upcoming road event, and wherein the estimated cold-start emissions of the predicted engine operation is based on the estimated cold-start emissions associated with the predicted engine speed and/or predicted engine torque.

12. A vehicle comprising an engine system and the controlling apparatus according to claim 11, the engine system comprising the engine and the EATS.

* * * * *